Aug. 2, 1932.  J. C. CONRAD  1,870,039
COTTON IMPALING AND CLEANING MACHINE FOR HARVESTERS
Filed March 10, 1930  2 Sheets-Sheet 1
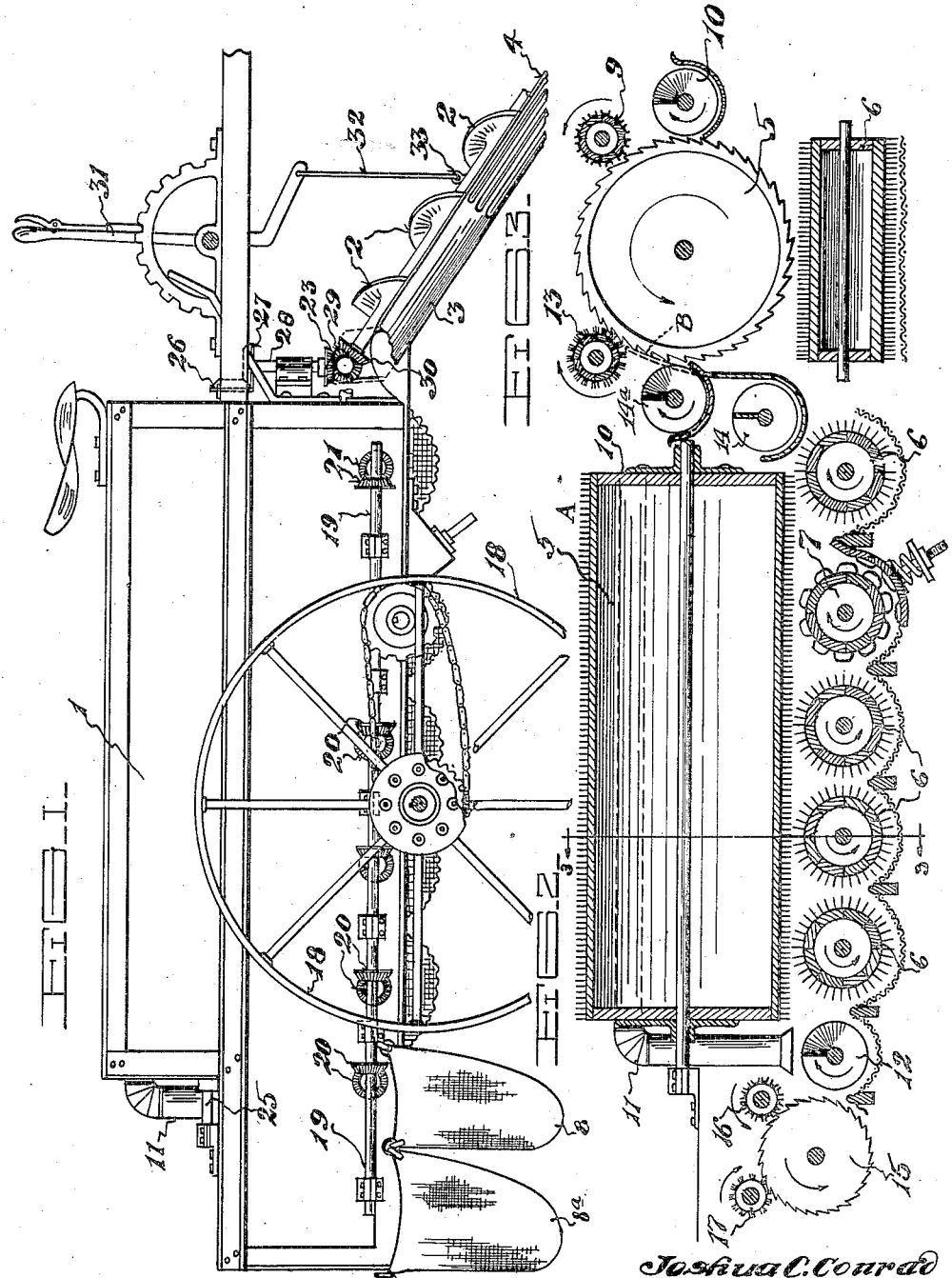
Joshua C. Conrad
INVENTOR.
BY
ATTORNEY

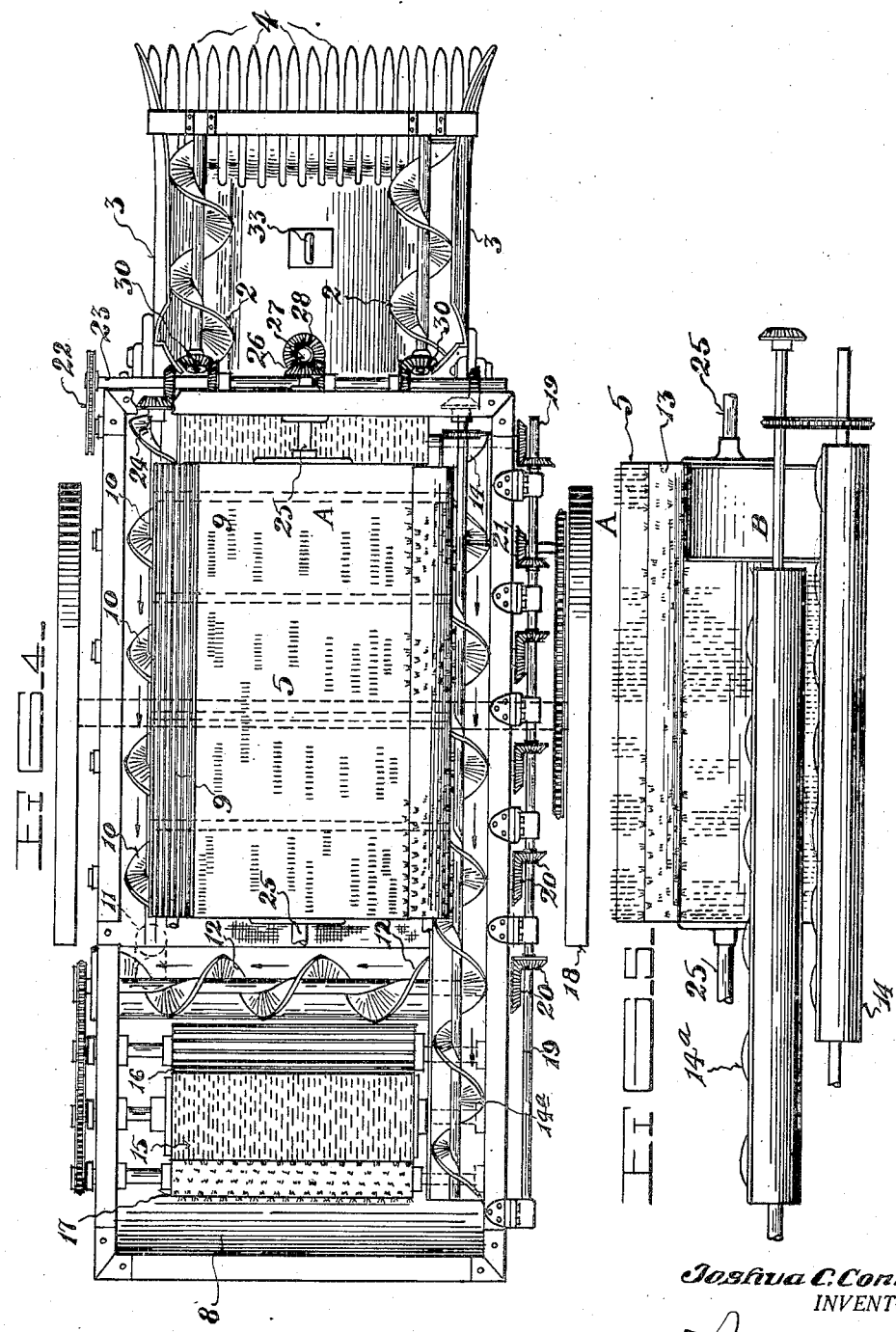

Patented Aug. 2, 1932

1,870,039

UNITED STATES PATENT OFFICE

JOSHUA C. CONRAD, OF FORT WORTH, TEXAS

COTTON IMPALING AND CLEANING MACHINE FOR HARVESTERS

Application filed March 10, 1930. Serial No. 434,673.

This invention relates to cotton impaling and cleaning machines and it has particular reference to a type of cotton harvesting machines wherein the cotton is stripped from the stalks without descrimination as to the various stages of maturity which the bolls have attained, and causing the cotton and attendent trash content to enter the machine enmasse, to be divested of leaves, sticks, stems and parts of stalk, clinging to the seed cotton, thereby preparing the same for ginning with only the minimum of the cleaning operations in use in ginneries at present, which are obviously expensive adjuncts to gins and are only necessary except in cases where the cotton is roughly gathered and conveyed to the gin without cleaning.

While the foregoing is the most important of the several objects of the invention, the latter contemplates the provision of a novel impaling method by which the cotton is gathered and cleaned according to its stage of maturity, that is to say, when cotton is gathered by stripping methods, there may be clean white cotton in full maturity upon the stalks having also thereon cotton in various immature stages and unopened bolls, which if caused to become mixed together in the cleaning operations will not only materially degrade the sample of the mature cotton but will likewise reduce the grade of the bulk when prepared for ginning. This impaling method is carried out by dealing first with the mature cotton, removing therefrom hulls, burrs and other foreign matter in order that it will have the appearance of hand picked cotton, depositing it in a suitable receptacle, then dealing with the lower grade immature cotton, in the same manner but depositing the latter in a receptacle placed apart from that of the mature white cotton.

A further object of the invention resides in the improved manner in which the gathered cotton is impaled for the cleaning operations, which consists in flinging the cotton with its trash content against a fast revolving, toothed drum, rotating in a direction transverse to the direction in which the cotton is being conveyed through the machine, thereby bringing about a dual centrifugal cleaning action of a novel nature, and due to which the cotton receives the maximum cleaning effect.

With the foregoing objects as paramount, the invention has particular reference to its salient features of construction and arrangement of parts by which the foregoing objects are attained, and which will become manifest as the description proceeds, taken in connection with the accompanying drawings, wherein;

Figure 1 is an elevational view, of a machine suggesting a wheeled frame, housing and gathering devices, by which the invention may be successfully applied to its purpose.

Figure 2 is an axial sectional view of the invention, showing the beaters and concaves relative to the impaling drum, and further showing the direction of travel of the latter.

Figure 3 is a cross section on lines 3—3 of Figure 2.

Figure 4 is a plan view of the preferred embodiment of the machine, with the top of the housing removed, and Figure 5 is a side elevational view of the large impaling drum, exclusive of the beater and concave assembly and final impaling mechanism, but illustrating the manner in which the matured cotton is bypassed to the receptacle separate from that which finally receives the rough cotton.

Accordingly, the invention consists primarily of wheeled body 1, represented in Figure 1, which is shown herein as a suitable casing for the principle elements of the invention hereinafter explained, and may be altered if necessary or desirable to bring about the maximum effect produced by the operative parts of the invention.

The present machine is designed to strip cotton stalks of cotton and foliage and convey the same by flight conveyors 2 into the machine, which conveyors are operated within an apron having troughs to receive the same. This apron is provided with fingers 4, shown complete in Figure 4, which are so arranged as to engage and strip the foliage from the stalk, in order that the conveyors 2 may more readily receive and carry the same into the machine.

While the invention is not limited to the particular means shown for driving the various elements of which the same is constituted, such driving means is suggested as a type which may be modified or altered to effect a more practical and convenient drive for the elements of the invention.

Referring now to the elements of the invention which are arranged in co-operative relationship to perform the functions hereinafter explained, reference is primarily made to Figure 2, illustrating in section the toothed impaling drum 5, assisted by the beater cylinders 6 in ridding the cotton of leaves, hulls and fragments of the stalks, as it passes progressively toward the rear of the machine.

These beater cylinders 6, with the exception of the primary or first cylinder of the assembly are arranged to revolve in a counter clockwise direction as indicated by the arrows thereon, thereby conveying the cotton toward the delivery end of the machine after having been first received by the primary drum from the conveyors 2. It will be noted, especially in Figure 2 that the primary beater cylinder revolves in a clockwise direction, thereby to impart to the incoming material the primary beating action, to divest the same of the major trash content, the material thence being thrown against the large impaling drum 5, impaling the white, open cotton on the front part of the impaling drum 5, allowing the immature cotton, weighted with hulls, burrs, bolls and other substance, to fall into the boll breaker cylinder 7, to be thrown upward again against the impaling drum 5, which sweeps away the cotton, with some hulls and the like, inclined to adhere thereto, the said white open cotton being doffed into a separate conveyor to be hereinafter designated by a reference character.

It is important to note that the axis of the impaling drum and the axes of the beater cylinders are at right angles. This feature enables the drum to receive material at several points along its length, yet depositing the cotton extracted from the open bolls within a suitable receptacle 8 either drawn or carried by the machine, thereby separating it from the lower grade cotton extracted from immature and unopened bolls which is deposited within another receptacle 8a.

The end elevational view of the machine, taken on lines 3—3 of Figure 2 shows clearly the devices by which the cotton is cleaned, impaled, stripped and doffed during operation of the machine. The beater cylinders are shown in their relationship with the drum 5, which, in rotation receives the cotton thrown upward by the beater cylinders 6, carrying it upward and further cleaning it by centrifugal action, due to the rapid rotation of the drum. As the cotton is carried upward, the stripper roll 9, which is rotating at a more rapid rate than the drum, brushes off adhering particles of trash, which latter fall into a conveyor 10 to be carried to a conduit 11 and are discharged into a similar conveyor 12 operating at right angles with respect to the former conveyor 10, whence they are carried from the machine onto the ground, there to remain as a fertilizer for the soil.

On the opposite side of the impaling drum 5 is a doffing brush 13, which doffs the cotton from the drum 5 on its down going side, the white open cotton being discharged into the conveyor 14, by way of a bypass chute B, before it passes the point A, on the drum 5, and likewise carried to the rear end of the machine where it is discharged into receptacle 8, previously referred to, while the immature unopened bolls are carried through the breaker 7 and along the drum 5 to be divested of attendant burrs, stems and trash whereupon it is removed from the drum 5 by the doffer brush 13 into a conveyor 14a and deposited in a receptacle 8a placed apart from the receptacle 8 receiving the white open cotton.

As the cotton, together with its remaining trash content reaches the last of the series of beater drums 6, it is discharged into the conveyor 12, mentioned previously whereby it may receive a final cleaning process through the medium of the small impaling drum 15, apparent in Figures 2 and 4. This drum is likewise provided with a stripper roll 16 and a doffing brush 17, constructed in a manner similar to the large impaling drum 5, but operates in a manner transverse to said large drum.

This final cleaning action is accomplished by causing the cotton to be thrown upward against the drum 15 by the conveyor 12, its full length, as shown in the plan view, the then major trash content being discharged back into the conveyor 12, allowing the cotton adhering thereto to be doffed into the receptacle 8a.

Thus it is apparent from the foregoing that there is but little loss in gathering and cleaning cotton by the invention, since it very effectively divides the cotton into two classes, one being the matured cotton while the other is the bolley or immature cotton. The mature cotton, being impaled on the large drum 5 as the foliage enters the machine, does not pass the point A, and is removed from the drum 5 by the doffer brush 13 into the conveyor 14 which delivers it into the receptacle 8.

The remainder of the foliage, including the small immature bolls, is passed through the boll breaker 7 and carried along the full length of the drum 5 which impales the cotton and, by the assistance of the stripper roll 9, it is divested of all the burrs and other trash content and carried by a conveyor 14a into a receptacle 8a placed apart from the receptacle 8 receiving the mature cotton.

Concerning the drive suggested for the elements of the invention, it is pointed out that the traction wheel 18 drives the shaft of the breaker roll, which, by means of a miter gear assembly (not shown) drives shaft 19 in a clockwise direction, thereby causing the several beater cylinders 6 rearwardly of the breaker cylinder to revolve in a counter clockwise direction, due to the relationship of the miter gears 20, on the ends of the cylinder shafts and main shaft 19. It will be noted that the breaker roll shaft and first beater cylinder shaft rotate in a direction opposite to the remainder of the cylinders, which is provided for by the reverse relationship of gears 21.

On the opposite end of the first beater shaft is a sprocket chain 22, as shown in Figure 4 which drives a shaft 23, which has connection with the shaft of conveyor 10 by means of gears 24. A similar drive is obtained from the opposite end of the shaft 23 to operate conveyor 14a, for carrying the immature impaled cotton into the receptacle 8a. This power transmission may be clearly seen in Figure 4 but is purposely left out of Figure 1 in order that no confusion will result in defining the drive for the large impaling drum 5, which as apparent in Figure 1, has a shaft 25, having thereon a gear 26, co-operating with a similar gear 27 upon a vertical shaft 28, which is driven by the first shaft 23 through gears 29. This shaft likewise drives the flight conveyors 2 through the gears 30 as illustrated in Figure 4. The conveyor 14 is operated by a chain and sprocket assembly from the conveyor 14 A as in Figure 5.

A lever 31, is provided to raise and lower the apron and operate through a connection 32 which is secured to the apron by an eye bolt 33.

It is of course obvious that the final cleaning assembly comprised of the saw cylinder 15, and stripping and doffing rolls 16 and 17 respectively, may be dispensed with when operating the machine in cotton showing a comparatively good maturity.

Though the invention has been described with great particularity, the details of the embodiment of the invention herein shown are not to be construed as being limited thereto, as changes in arrangement and substitution of equivalents may be made by those skilled in the art without departing from the invention as defined in the appended claims.

What is claimed is:—

1. In a seed cotton hulling and cleaning machine, a toothed cylinder having a series of beater cylinders arranged in transverse relationship thereto; means to impart a rapid cleaning action to said cotton to remove the hulls and extraneous matter therefrom as the said cotton is urged progressively through the machine.

2. In a seed cotton hulling and cleaning machine, a series of beater drums a toothed drum arranged in transverse relationship thereto and capable of impaling cotton carried by said beater drums; means to disengage the hulls and stems from said impaled cotton on the up going side of said toothed drum and means to disengage said cotton from said toothed drum on the latter's down going side.

3. In a portable cotton hulling and cleaning machine, a series of beater drums and foraminous concaves; a toothed impaling drum arranged transversely of said beater drums to impale cotton thrown against the latter by said beater drums as the said cotton is urged progressively over said concaves; means to disengage hulls and stems from said cotton on the up going side of said drum and means to remove the impaled cotton from said drum on the down going side.

4. In a portable cotton hulling and cleaning machine, an impaling drum, a series of beater drums arranged transversely of said impaling drum to impart a rapid centrifugal cleaning action to cotton and impaling the latter on said impaling drum; means to disengage from said impaling drum particles of hulls and parts of stalks and means to remove the said cotton from said drums.

5. In a cotton hulling and cleaning machine, a toothed impaling drum; a multiplicity of cleaning cylinders arranged in series and capable of transverse operation with respect to said impaling drum to urge said cotton against said impaling drum; means to remove hulls and parts of stalks from said impaled cotton and means to disengage said cotton from said impaling drum.

6. In a portable cotton cleaning and hulling machine, an impaling drum, a series of beater cylinders arranged transversely in series beneath said impaling drum capable of imparting a rapid centrifugal cleaning action to cotton over a series of foraminous concaves and upward against said impaling drum; means to extricate adhering hulls and stems from said cotton impaled by said drum on its up going side and means to remove said impaled cotton into a conveyor.

7. A cotton hulling and cleaning machine including an impaling drum and a series of beater cylinders arranged in transverse relationship to said drum and operating to discharge material progressively to be impaled on said drum.

8. A cotton hulling and cleaning machine including an impaling drum and a series of beater cylinders operating to project material against said drum progressively its full length, an auxiliary impaling drum adjacent said first drum operating transversely with respect to the latter and means for conveying the discharge from said beater cylinders along the operative face of said auxiliary impaling drum.

9. A cotton hulling and cleaning machine including an impaling drum arranged to receive material from a series of beaters operatively disposed transversely relative to said impaling drum, and a boll breaking cylinder and foraminous concave arranged between and co-operating with said series of beaters.

10. A machine of the character described including a cotton impaling drum arranged to impale cotton from a series of beaters operating transversely thereunder, said beaters conveying material progressively the full length of said drum, and auxiliary means for receiving and imparting a final cleaning action to material finally discharged from said beaters.

11. A machine of the character described including a large impaling drum and a series of relatively small beater cylinders operating transversely with respect to the axis of said impaling drum, one of said beater cylinders operating to impale relatively clean material onto said impaling drum as the said material enters said machine.

12. A machine of the character described including an impaling drum having axially parallel conveyors on either side thereof, one of said conveyors being disposed to receive relatively clean cotton impaled upon the forward portion of said drum; means for projecting material successively against said drum and means for separately receiving said material in accordance with its stage of maturity.

In testimony whereof I affix my signature.

JOSHUA C. CONRAD.